(12) United States Patent
Lototsky et al.

(10) Patent No.: US 10,386,817 B1
(45) Date of Patent: Aug. 20, 2019

(54) MULTI-CORE PROCESSING MACHINE TOOL CONTROL SYSTEM

(71) Applicant: HAAS AUTOMATION, INC., Oxnard (CA)

(72) Inventors: Sergey Lototsky, Camarillo, CA (US); Radik Gradinarski, Camarillo, CA (US)

(73) Assignee: HAAS AUTOMATION, INC., Oxnard, CA (US)

( * ) Notice: Subject to any disclaimer, the term of this patent is extended or adjusted under 35 U.S.C. 154(b) by 107 days.

(21) Appl. No.: 15/263,251

(22) Filed: Sep. 12, 2016

Related U.S. Application Data (60) Provisional application No. 62/217,642, filed on Sep. 11, 2015.

(51) Int. Cl.
| | | |
|---|---|---|
| *G05B 19/40* | (2006.01) | |
| *G05B 19/18* | (2006.01) | |
| *G05B 19/4093* | (2006.01) | |
| *G05B 19/402* | (2006.01) | |
| *G05B 19/414* | (2006.01) | |

(52) U.S. Cl.
CPC ..... *G05B 19/40938* (2013.01); *G05B 19/402* (2013.01); *G05B 19/18* (2013.01); *G05B 19/4144* (2013.01); *G05B 2219/34045* (2013.01); *G05B 2219/37618* (2013.01)

(58) Field of Classification Search
CPC ............ G05B 19/40938; G05B 19/402; G05B 2219/37618; G05B 2219/34045
See application file for complete search history.

(56) References Cited

U.S. PATENT DOCUMENTS

| | | | | |
|---|---|---|---|---|
| 4,038,533 A | * | 7/1977 | Dummermuth .... | G05B 19/4147 700/18 |
| 4,079,235 A | * | 3/1978 | Froyd ................. | G05B 19/186 318/571 |
| 4,109,185 A | * | 8/1978 | Froyd ................. | G05B 19/351 318/571 |

(Continued)

*Primary Examiner* — Mohammad Ali
*Assistant Examiner* — Kelvin Booker
(74) *Attorney, Agent, or Firm* — Morgan, Lewis & Bockius LLP (57) ABSTRACT

A machine tool control system may include a processing module and subsystem circuitry coupled to the processing module by a bus. The processing module may include memory circuitry and a multi-core processor. The multi-core processor may include a first set of processor cores assigned exclusively to perform real-time tasks for controlling motion relative to one or more axes by executing first instructions stored in the memory circuitry, a second set of processor cores assigned exclusively to perform non-real-time tasks by executing second instructions stored in the memory circuitry, and a timer circuit configured to generate a cycle signal at periodic intervals. The subsystem circuitry may be configured to obtain axis feedback data from one or more feedback encoders and axis control data from the first set of processor cores during each of the periodic intervals. The subsystem circuitry further may be configured to provide the obtained axis feedback data to the first set of processor cores and the axis control data to one or more axis drivers in response to the cycle signals generated by the timer circuit.

15 Claims, 5 Drawing Sheets

(56) References Cited

U.S. PATENT DOCUMENTS

| | | | | |
|---|---|---|---|---|
| 4,120,583 A * | 10/1978 | Hyatt | ............. | B60R 16/0373 355/132 |
| 4,149,235 A * | 4/1979 | Froyd | ............. | G05B 19/05 700/169 |
| 4,310,878 A * | 1/1982 | Hyatt | ............. | B60R 16/0373 318/608 |
| 4,364,110 A * | 12/1982 | Hyatt | ............. | B60R 16/0373 700/180 |
| 4,370,720 A * | 1/1983 | Hyatt | ............. | B60R 16/0373 700/194 |
| 4,396,976 A * | 8/1983 | Hyatt | ............. | B60R 16/0373 700/1 |
| 4,445,776 A * | 5/1984 | Hyatt | ............. | G03F 7/70633 355/54 |
| 4,513,379 A * | 4/1985 | Wilson | ............. | G05B 19/4147 700/169 |
| 4,531,182 A * | 7/1985 | Hyatt | ............. | G06F 13/16 700/180 |
| 4,829,419 A * | 5/1989 | Hyatt | ............. | G03F 9/7049 700/83 |
| 4,956,785 A * | 9/1990 | Kawamura | ............. | G05B 19/408 700/159 |
| 4,987,359 A * | 1/1991 | Saitoh | ............. | G05B 19/182 318/567 |
| 5,013,989 A * | 5/1991 | Kurakake | ............. | G05B 19/4141 318/560 |
| 5,025,200 A * | 6/1991 | Kurakake | ............. | G05B 19/4062 318/569 |
| 5,270,941 A * | 12/1993 | Hanaki | ............. | G05B 19/182 318/625 |
| 5,278,766 A * | 1/1994 | Takahashi | ............. | G05B 19/184 700/172 |
| 5,523,662 A * | 6/1996 | Goldenberg | ............. | B25J 9/06 318/568.11 |
| 5,730,816 A * | 3/1998 | Murphy | ............. | B65C 9/0006 156/229 |
| 5,765,456 A * | 6/1998 | Grossmann | ............. | B23B 3/168 29/27 C |
| 5,922,266 A * | 7/1999 | Grove | ............. | B29C 45/561 264/297.2 |
| 5,926,389 A * | 7/1999 | Trounson | ............. | G05B 19/251 700/187 |
| 5,968,439 A * | 10/1999 | Grove | ............. | B29C 45/561 264/297.2 |
| 5,993,121 A * | 11/1999 | Fiesta | ............. | B23Q 11/1076 408/56 |
| 8,269,645 B2 * | 9/2012 | West | ............. | G09G 5/14 340/2.7 |
| 8,294,403 B2 * | 10/2012 | Haas | ............. | G05B 19/406 318/473 |
| 8,299,742 B2 * | 10/2012 | Soliman | ............. | G05B 19/416 318/569 |
| 8,695,763 B2 * | 4/2014 | Haas | ............. | B23Q 11/123 184/6.14 |
| 9,518,815 B2 * | 12/2016 | Velasquez | ............. | G01B 7/30 |
| 9,709,974 B2 * | 7/2017 | Jiang | ............. | G05B 19/19 |
| 9,904,278 B2 * | 2/2018 | Ogino | ............. | G05B 19/4141 |
| 2001/0056544 A1 | 12/2001 | Walker | ............. | B60R 25/02 726/2 |
| 2004/0024472 A1 * | 2/2004 | Evans | ............. | G05B 19/4097 700/2 |
| 2005/0174086 A1 * | 8/2005 | Iwashita | ............. | G05B 19/4144 318/641 |
| 2008/0243299 A1 * | 10/2008 | Johnson | ............. | G05B 19/414 700/169 |
| 2010/0088706 A1 * | 4/2010 | Dong | ............. | G06F 9/4887 718/103 |
| 2010/0174886 A1 * | 7/2010 | Kimelman | ............. | G06F 9/4818 712/28 |
| 2011/0022822 A1 * | 1/2011 | Chandhoke | ............. | G06F 9/5066 712/36 |
| 2011/0161965 A1 * | 6/2011 | Im | ............. | G06F 9/5038 718/102 |
| 2011/0238955 A1 * | 9/2011 | Nickolls | ............. | G06F 9/30072 712/220 |
| 2013/0041510 A1 * | 2/2013 | Kurakake | ............. | G05B 19/4141 700/275 |
| 2014/0042950 A1 * | 2/2014 | Aoyama | ............. | G05B 19/4148 318/569 |
| 2014/0228998 A1 * | 8/2014 | Jiang | ............. | G05B 19/19 700/186 |
| 2016/0062348 A1 * | 3/2016 | Ogino | ............. | G05B 19/4141 700/2 |
| 2017/0163190 A1 * | 6/2017 | Curtis | ............. | G05B 19/40 |
| 2018/0356793 A1 * | 12/2018 | Kanemaru | ............. | G05B 19/4083 |

* cited by examiner

MULTI-CORE PROCESSING MACHINE TOOL CONTROL SYSTEM

This application claims priority under 35 U.S.C. § 119(e) to U.S. Provisional Application No. 62/217,642, entitled "MACHINE TOOL CONTROL SYSTEM" and filed on Sep. 11, 2015, which is hereby incorporated by reference herein.

BACKGROUND

The subject application relates generally to computer numerical control (CNC) machine tools and, more particularly, to CNC machine tool control systems.

CNC machine tools are operated by a sequence of commands or instructions in a program to shape a workpiece. The commands or instructions cause the machine tool to automatically position a tool relative to a workpiece and move the tool or the workpiece relative to each other to shape the workpiece. A single program may be executed repeatedly on a CNC machine tool to generate multiple identically shaped workpieces. Execution of the program requires coordination of multiple components of the machine tool under timing constraints in order to ensure that the workpieces are completed safely and as planned. As CNC machine tools and workpiece designs become more complex, the machine tool control systems used to execute the programs increase in cost and complexity.

SUMMARY

According to aspects of the subject technology, a machine tool control system may include a processing module and subsystem circuitry coupled to the processing module by a bus. The processing module may include memory circuitry and a multi-core processor. The multi-core processor may include a first set of processor cores assigned exclusively to perform real-time tasks for controlling motion relative to one or more axes by executing first instructions stored in the memory circuitry, a second set of processor cores assigned exclusively to perform non-real-time tasks by executing second instructions stored in the memory circuitry, and a timer circuit configured to generate a cycle signal at periodic intervals. The subsystem circuitry may be configured to obtain axis feedback data from one or more feedback encoders and axis control data from the first set of processor cores during each of the periodic intervals. The subsystem circuitry further may be configured to provide the obtained axis feedback data to the first set of processor cores and the axis control data to one or more axis drivers in response to the cycle signals generated by the timer circuit.

According to further aspects of the subject technology, a method for controlling a machine tool may include generating a cycle signal at periodic intervals by a timer circuit. In response to each cycle signal, the method may further include transferring current axis feedback data from subsystem circuitry to a processing module comprising a multi-core processor, initiating a real-time motion control loop in a first processor core of the multi-core processor, wherein the real-time motion control loop generates next axis control data based on the current axis feedback data and a current trajectory point, requesting, by the subsystem circuitry, next axis feedback data from a feedback encoder corresponding to the axis, and loading current axis control data into an axis driver corresponding to an axis of the machine tool. During each of the periodic intervals, the method may further include buffering the next axis control data generated by the motion control loop, wherein the next axis control data is loaded into the axis driver at a next cycle signal, and receiving the next axis feedback data from the feedback encoder, wherein the next axis feedback data is transferred to the processing module at the next cycle signal by the subsystem circuitry.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

The subject machine tool control system utilizes a multi-core processor in a processing module, together with subsystem circuitry, to manage the components of a CNC machine tool and ensure the logic and/or timing relationships that are utilized by the individual components of the system to interoperate effectively. For example, non-real time tasks and real-time tasks may be separated and exclusively assigned to different dedicated cores of the multi-core processor, and the machine tool control system may maintain a strict core-per-task policy, e.g. such that a core performing real-time tasks does not perform any non-real time tasks, and vice-versa. The machine tool control system may utilize an asymmetric multi-processing (AMP) method to assign tasks and scheduling to each of the various cores of the multi-core processor in order to ensure that a core dedicated to real-time tasks will not be scheduled for any non-real time tasks, and vice-versa. The subject system also may utilize a hardware timer as a time reference for processes and as a basis for synchronization mark deadlines.

The subject system is architected such that axis feedback data (position, velocity, acceleration, direction etc.) is fetched, and axis control data is applied, at substantially the same time, e.g. on a hardware synchronization mark based on the time based cycle signal generated by a hardware timer circuit. In this manner, the subject system can ensure that there is no delay or time drift between axis control data applied to different axis drivers, while also ensuring precise synchronization. Furthermore, the subject system allows for tasks to be completed at any time prior to the predetermined deadlines, e.g. as indicated by the hardware synchronization mark, rather than requiring that each task be performed immediately.

Figure 1:
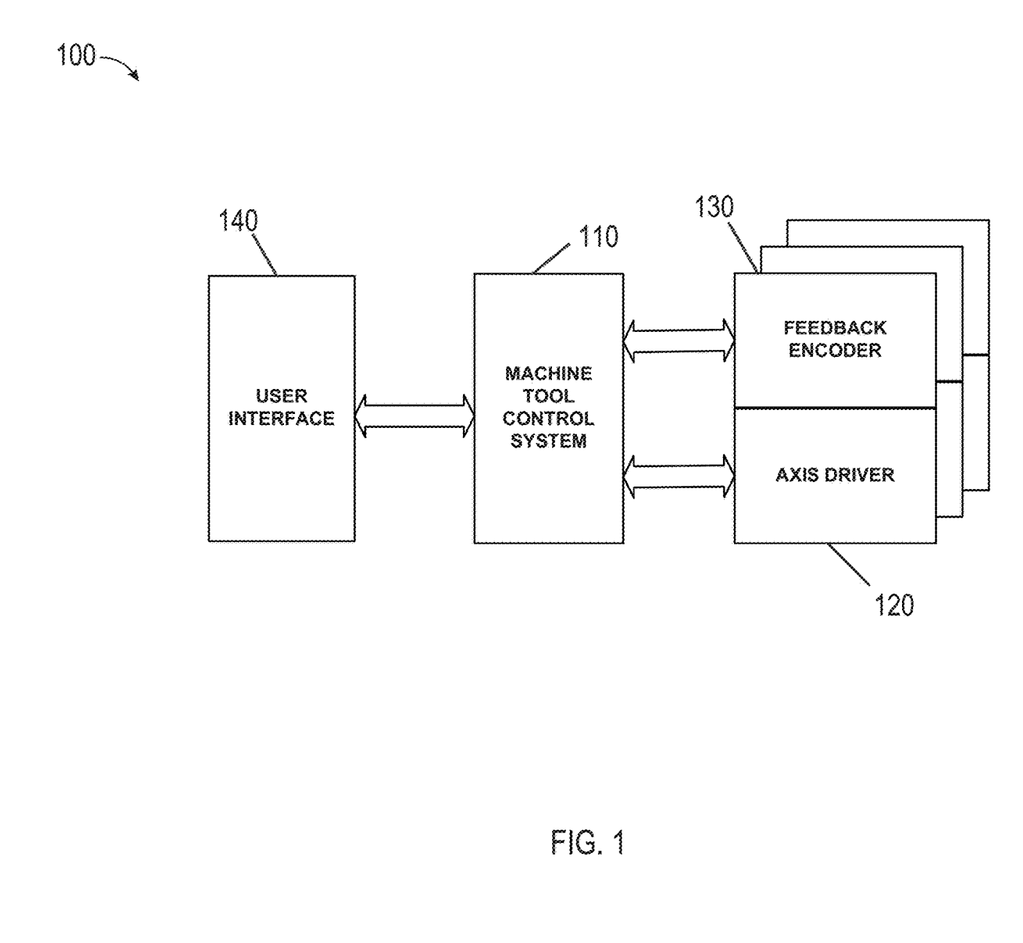
FIG. 1 illustrates an example machine tool that may implement the subject machine tool control system in accordance with one or more implementations.

FIG. 1 illustrates an example CNC machine tool 100 that may implement the subject machine tool control system 110 in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example CNC machine tool 100 includes a machine tool control system 110, one or more axis drivers 120, one or more feedback encoders 130, and a user interface 140. Each of the one or more axis drivers 120 effects motion along or around a respective axis. The one or more axis drivers 120 may position an implement/tool, a workpiece, or both along or around one or more axes. For example, two axis drivers may be used to position a workpiece linearly along two respective perpendicular axes, a third axis driver may be used to position a tool linearly along a third axis orthogonal to the two perpendicular axes, and a fourth axis driver may be used to rotate the tool around the third axis to cause material removal from the workpiece according to a program.

The one or more axis drivers 120 each represent a mechanical, electro-mechanical, hydraulic, etc. system configured to effect motion along or around a respective axis. The one or more axis drivers 120 may include servo motors, stepper motors, actuators, etc. The one or more axis drivers 120 may include both the mechanical components as well as the electrical components configured to drive the mechanical components based on an amount of current/voltage/power applied to the components.

The one or more feedback encoders 130 represent encoders configured to detect movement along or around respective axes effected by the one or more axis drivers 120. The one or more feedback encoders 130 may detect linear motion or rotational motion using optical detectors, magnetic detectors, etc. The detected motion may be used to determine a position of the workpiece and/or tool. The detected motion also may be used to determine a speed of the motion. As discussed further below, the one or more feedback encoders 130 provide axis feedback data used to generate axis control data used to control the one or more axis drivers 120. The one or more feedback encoders 130 may be incorporated into the one or more axis drivers 120, respectively, or may be separate from the one or more axis drivers 120.

The workpiece may be any type of material such as metal, wood, plastic, glass, etc. The implement/tool may be any type of implement/tool appropriate for removing the type of material of the workpiece. The implement/tool may be a cutting implement, a grinding implement, an electrical discharge implement, or generally any implement. In addition, the CNC machine tool 100 may exchange implements/tools during operation of a program to allow for different types/rates of material removal and/or finish work to be performed on a workpiece.

The subject technology is not limited to any particular number of axes and correspondingly axis drivers and feedback encoders. Example machine tool control systems may monitor and control motion along and/or around five axes, eight axes, sixteen axes, etc. The more axes available for movement in the CNC machine tool, the more complex the shaping and finishing of a workpiece may be.

The machine tool control system 110 may include a processing module and subsystem circuitry configured to communicate with the one or more axis drivers 120 and the one or more feedback encoders 130 via respective interfaces. An example machine tool control system 110 is discussed further below with respect to FIG. 2. An example multi-core processor that may be utilized by the machine tool control system 110 is discussed further below with respect to FIG. 3.

In operation, the machine tool control system 110 sends axis control data to one or more of the axis drivers 120 at periodic intervals, such as every 250 microseconds, for example. The axis control data is used to operate the one or more axis drivers to move a workpiece and/or tool along and/or around one or more axes. The axis control data may be used to control the velocity, position, direction, and/or acceleration of the movement. The machine tool control system 110 also periodically receives and/or obtains axis feedback data from the one or more feedback encoders 130. The axis feedback data may indicate the position, velocity, direction, and/or acceleration of the motion effected by the one or more axis drivers 120 based on the axis control data provide to the one or more axis drivers 120. The machine tool control system 110 may utilize the axis feedback data to refine subsequent axis control data provided to the one or more axis drivers 120. An example timing diagram describing the interactions between the machine tool control system 110, the one or more axis drivers 120 and the one or more feedback encoders 130 is discussed below with respect to FIG. 4.

According to aspects of the subject technology, user interface 140 may include one or more display devices for displaying information to a user/operator of CNC machine tool 100. User interface 140 also may include one or more mechanisms for receiving user input to program/control CNC machine tool 100, select programs for execution by the machine tool control system 110, etc. The mechanisms may include key panels, either physical or virtual displayed on a display device, pointer mechanisms such as mouse, stylus, trackball, etc. User interface 140 also may include interfaces for connecting computer-readable media such as flash drives for loading programs into the machine tool control system 110, downloading operation logs, etc.

Figure 2:
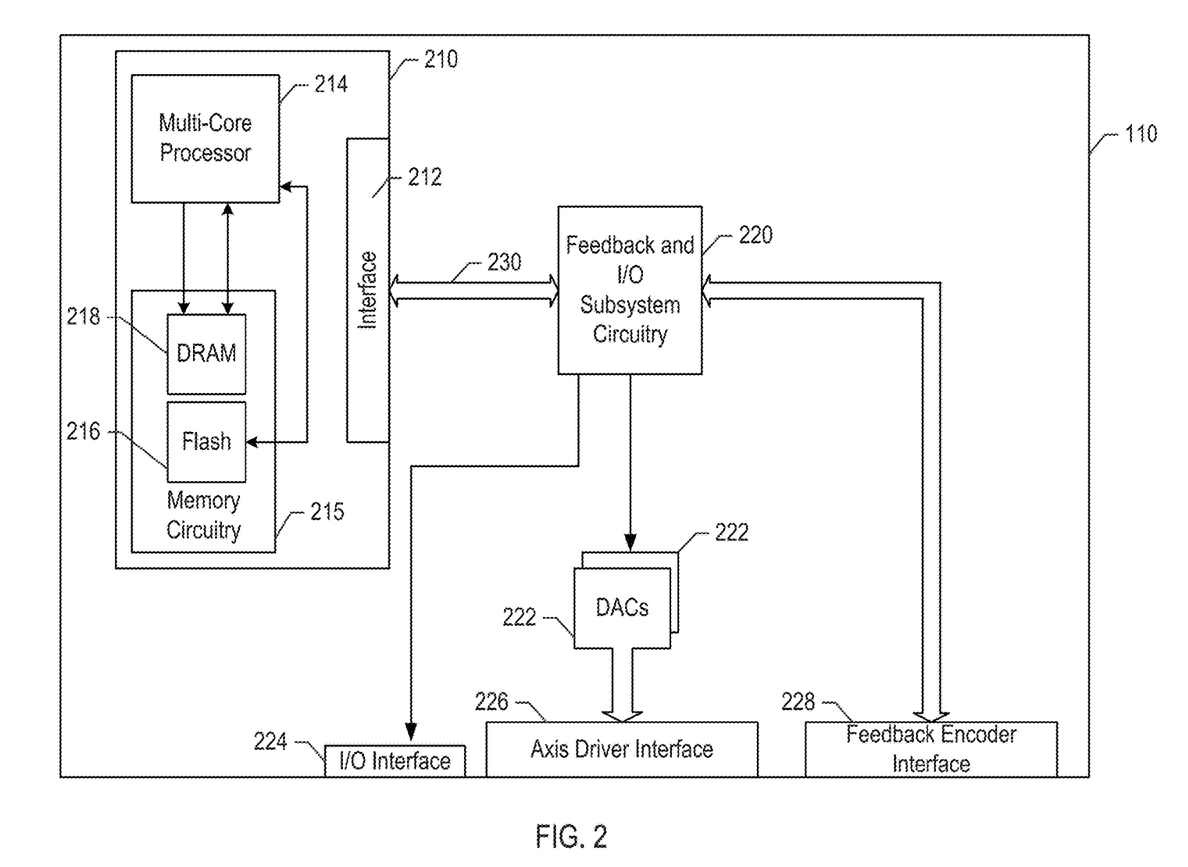
FIG. 2 illustrates an example machine tool control system in accordance with one or more implementations.

FIG. 2 illustrates an example machine tool control system 110 in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example machine tool control system 110 includes processing module 210, feedback and input/output (I/O) subsystem circuitry 220, one or more digital-to-analog converters (DACs) 222, an I/O interface 224, an axis driver interface 226, a feedback encoder interface 228, and a bus 230 that couples the feedback and I/O subsystem circuitry 220 and the processing module 210. The processing module 210 includes an interface 212, a multi-core processor 214 and memory circuitry 215. The memory circuitry 215 includes one or more flash memory modules (or circuits) 216 (non-volatile memory), and one or more random access memory (RAM) modules (or circuits) 218 (volatile memory).

The processing module 210, e.g. the multi-core processor 214 and the memory circuitry 215, may be arranged as a separate interchangeable block that plugs into a main board containing other components of the machine tool control system 110. In this manner, the multi-core processor 214 and/or the memory circuitry 215 can be easily upgraded, changed and/or repaired.

The multi-core processor 214 may be a system on a chip (SoC), a multi-core advanced reduced instruction set computing (RISC) machine (ARM) processor, such as an i.MX6Q quad core processor, and/or generally any multi-core processor. In one or more implementations, the multiple cores of the multi-core processor 214 may be spread out across multiple integrated circuits. The one or more RAM modules 218 may include one or more dynamic random access memory (DRAM) modules, one or more double data rate type three synchronous dynamic random-access memory (DDR3) modules, or generally any memory modules. The one or more flash memory modules 216 may be embedded Multi-Media Controller (eMMC) flash memory modules, or generally any flash memory modules. In one or more implementations, the processing module 210 may include 2 gigabytes of RAM modules 218 and 2 gigabytes of flash memory modules 216, or generally any amount of RAM modules 218 and/or flash memory modules 216.

The interface 212 may include one or more connectors, such as a Qseven connector, or generally any connector to provide physical and electrical connection between processing module 210 and bus 230. According to aspects of the subject technology, interface 212 may use a connector that allows processing module 210 to be detachably connected to bus 230. Allowing the processing module 210 to be removed and replaced facilitates easier upgrades to either the multi-core processor 214 and/or the memory circuitry 215 without requiring more substantial changes to the entire machine tool control system.

The bus 230 may be a peripheral component interconnect express (PCIe) bus, or generally any bus. In one or more implementations, the bus 230 may include four lines, or any number of lines, and the bus 230 may provide a data rate of 5 GT/s, or any speed. The feedback and I/O subsystem circuitry 220 may include one or more field programmable gate arrays (FPGAs), such as a Xilinx Arctik-7 FPGA based controller. The I/O interface 224 may be an RS-232 serial interface, e.g. to an I/O board. The I/O interface 224 may utilize four wires, or any number of wires, and the I/O interface 224 may provide a data rate of 5 Mbps. The serial connection to the I/O board via the I/O interface 224 allows for galvanic insulation between both boards. The feedback and I/O subsystem circuitry 220 is coupled to the one or more DACs 222 via a bus, such as a five-line serial peripheral interface (SPI) bus, that is used to transmit load signals, such as a SYNC load signal.

The axis driver interface 226 may include one or more axis drive control connectors, such as eight axis drive control connectors for an eight axis implementation. The axis driver interface 226 couples the machine tool control system 110 to the one or more axis drivers 120. The feedback and I/O subsystem circuitry 220 passes commands to the one or more axis drivers 120 via motion control channels, or servo control channels, through the one or more serial DACs 222 over the SPI bus, and via the axis driver interface 226. In one or more implementations, there may be a separate DAC 222 for each of the one or more axis drivers 120 connected to the axis driver interface 226. The feedback and I/O subsystem circuitry 220 may synchronize the one or more DACs 222 by first loading axis control data to each of the one or more DACs 222, and then causing the transfer of the outputs of the one or more DACs 222 with a single control line pulse that is controlled by the feedback and I/O subsystem circuitry 220.

The feedback encoder interface 228 may include one or more axis feedback encoder connectors, such as sixteen axis feedback encoder connectors for a sixteen axis implementation. The feedback encoder interface 228 may be coupled to the one or more feedback encoders 130. The feedback I/O subsystem circuitry 220 receives axis feedback data, such as motion axis feedback data, from the feedback encoders 130 via the feedback encoder interface 228. The feedback I/O subsystem circuitry 220 provides the axis feedback data to the processing module 210, and the processing module 210 utilizes the axis feedback data to determine and/or refine subsequent axis control data, as is discussed further below with respect to FIGS. 4 and 5. The feedback I/O subsystem circuitry 220 may provide the axis feedback data to the processing module 210 via the bus 230, e.g. a PCIe 6-lines high speed synchronous interface, as a single array of data every servo cycle, e.g. every 250 microseconds. In one or more implementations, the feedback and I/O subsystem circuitry 220, may process, format, and/or cache the axis feedback data prior to providing the axis feedback data to the processing module 210.

In one or more implementations, one or more of the processing module 210, the feedback and input/output (I/O) subsystem circuitry 220, the DACs 222, the I/O interface 224, the axis driver interface 226, the feedback encoder interface 228, the bus 230, the interface 212, the multi-core processor 214, the memory circuitry 215, the one or more flash memory modules 216, the one or more RAM modules 218, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
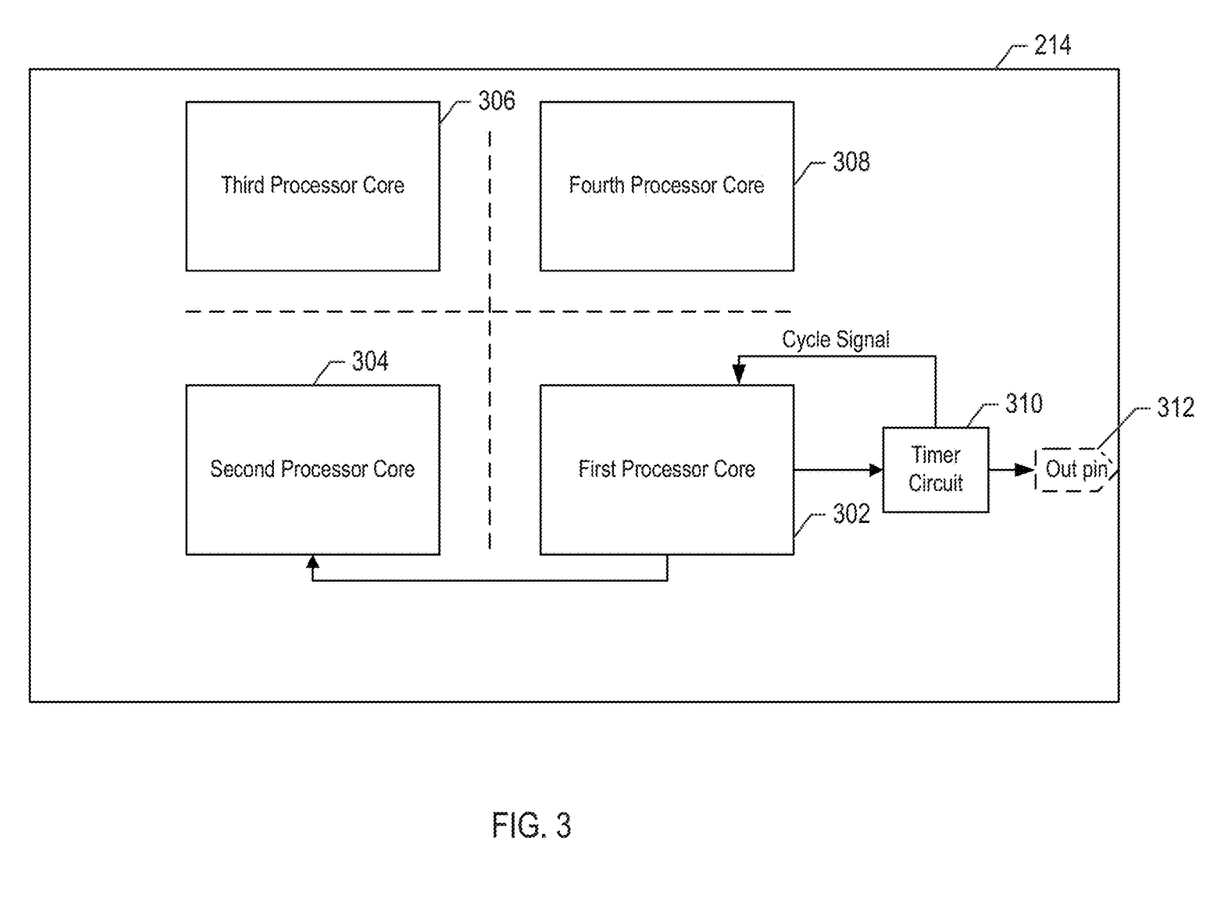
FIG. 3 illustrates an example multi-core processor of a machine tool control system in accordance with one or more implementations.

FIG. 3 illustrates an example multi-core processor 214 of a machine tool control system 110 in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The multi-core processor 214 includes a first processor core 302, a second processor core 304, a third processor core 306, a fourth processor core 308, a timer circuit 310, and an output pin 312. The output pin 312 couples the multi-core processor 214 to the feedback and I/O subsystem circuitry 220, e.g. via the interface 212 and the bus 230 or through separate wiring. In the example depicted in FIG. 3, the processor cores 302 and 304 are dedicated to real-time tasks, while the processor cores 306 and 308 are dedicated to non-real time tasks. However, any of the processor cores 302, 304, 306, 308 may be dedicated to either real-time or non-real time tasks.

The separation of real-time tasks to the processor cores 302 and 304 and non-real time tasks to the processor cores 306 and 308 ensures that real-time processes are not affected and/or delayed by non-real time processes. In this regard, the multi-core processor 214 includes private resources that are arranged to exclude core interference, and each of the processor cores 302, 304, 306, 308 may include a private floating point unit and an L1 cache (32K/32K). These resources may be accessible on a per core basis. Furthermore, peripherals and interrupt requests (IRQs) can be made private by assigning them to specific cores, which also facilitates preventing core interference. In addition to private resources, the multi-core processor 214 also includes mechanisms and circuitry to resolve possible core interference. For example, a large shared L2 cache (1 megabyte) can be partitioned and configured for application requirements. Other resources in the processing module 210, such as memory circuitry 215, also may be partitioned and configured for use by particular cores in the multi-core processor 214. The multi-core processor 214 may also include a snooping unit that manages a core priorities assessment and memory access scheduling to further prevent core interference.

According to aspects of the subject technology, the third processor core 306 may be dedicated to non-real time operating system tasks. The operating system may be, for example, a Linux operating system, or generally any operating system. When the multi-core processor 214 is running processes on multiple of the processor cores 302, 304, 306, 308, the operating system running on the third processor core 306 may be made aware of real-time threads running on one or more of the processor cores 302 and 304 through core shielding technology, which further enhances memory access and scheduling. The fourth processor core 308 is dedicated to other non-real time tasks, such as graphics processing, file input/output and communications. The graphics implemented by the fourth processor core 308 may include high efficiency graphics, such as three-dimensional graphics, and may include touchscreen support.

The third and fourth processor cores 306 and 308 may receive and process user input selecting or entering a program for shaping a workpiece. The program may include one or more sequences of instructions specifying position, velocity, acceleration, torque, force, etc. for a sequence of motion of the workpiece and/or a tool along one or more axes. The second processor core 304 may be informed of the selected program and subsequently load the selected program from non-volatile memory such as flash memory modules 216. Executing instructions to implement a main control loop, the second processor core 304 may interpret the instructions/commands in the program and generate a sequence of trajectory points for motion along and/or around the respective axes. These trajectory points are provided to the first processor core 302 for use in a motion control loop performed by the first processor core 302 by executing instructions. These operations are described further below with respect to FIGS. 4 and 5. Communication of data between processor cores in multi-core processor 214 and between multi-core processor 214 and subsystem circuitry 220 may be performed using protocol buffers.

The timer circuit 310 of the multi-core processor 214 is used to generate a single cycle or SYNC signal which is provided via the output pin 312 to the feedback and I/O subsystem circuitry 220. The feedback and I/O subsystem circuitry 220 utilizes the SYNC signal to synchronize the data loaded to the DACs 222, and to obtain the axis feedback data, e.g. position capture information, thus ensuring substantially exact timing and avoiding jitter that may be introduced by "soft real-time" implementations.

In one or more implementations, the multi-core processor 214 may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), etc.

Figure 4:
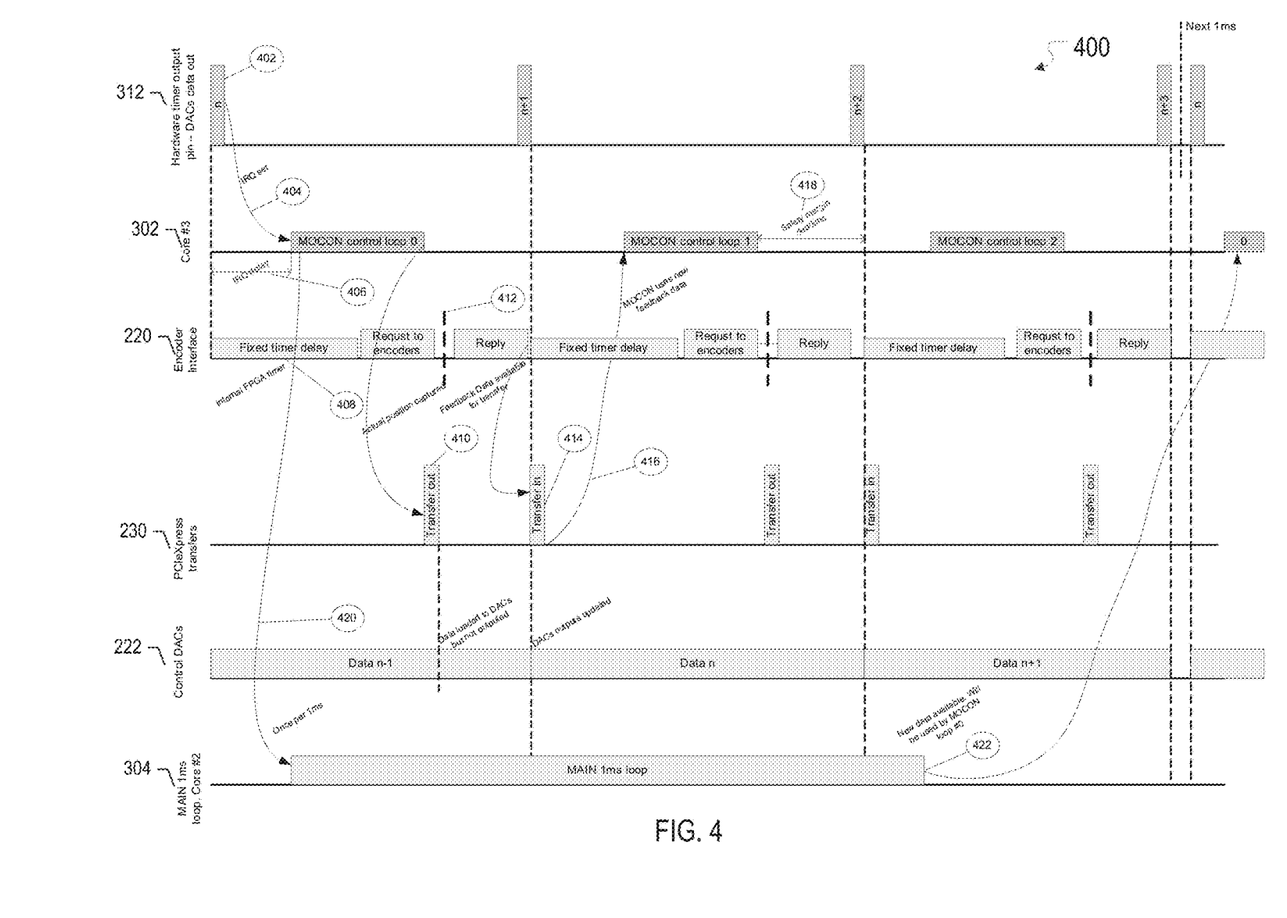
FIG. 4 illustrates an example timing diagram of a machine tool control system in accordance with one or more implementations.

FIG. 4 illustrates an example timing diagram 400 of machine tool control system 110 in accordance with one or more implementations. For explanatory purposes, the steps of the example timing diagram 400 are described herein as occurring in serial, or linearly. However, multiple steps of the example timing diagram 400 may occur in parallel and/or asymmetrically. In addition, the steps of the example timing diagram 400 need not be performed in the order shown and/or one or more of the steps of the example timing diagram 400 need not be performed.

The timing diagram 400 begins when the timer circuit 310 of the processing module 210 generates a cycle signal, e.g. by driving a hardware pin (402). The timer circuit 310 may be programmed to expire, e.g. generate another clock signal, at periodic intervals every servo cycle, such as every 250 microseconds. The timer overflow of the timer circuit 310 generates a periodic interrupt that starts a motion control loop on the first processor core 302 (404). The IRQ delay (406) may be a worst-case interrupt delay, e.g. the IRQ delay plus the safety margin deadline time should be less than the worst possible case needed for all calculations by the first processor core 302 each servo cycle.

The output pin 312 that is coupled to the feedback and I/O subsystem circuitry 220 provides the signal generated by the timer circuit 310 to the feedback and I/O subsystem circuitry 220. Upon receiving the signal, the feedback and I/O subsystem circuitry 220 initiates a delay timer that matches the timing of request/reply for axis feedback data from the feedback encoders to delay a request a predetermined period of time (408). As the motion control data to be loaded into the control DACs 222 is calculated by the first processor core 302, motion control data transfer from the processing module 210 to the feedback and I/O subsystem circuitry 220 via the bus 230 is initiated (410). The motion control data is passed from the feedback and I/O subsystem circuitry 220 to the DACs 222 and the motion control data is buffered in the DACs 222, e.g. the motion control data does not start to propagate to the outputs of the DACs 222. The actual load of the motion control data into the DACs 222 does not occur until the next cycle (periodic interval) starts, thus insuring proper control value application in a discrete system.

After the predetermined period of time has expired, the feedback and I/O subsystem circuitry 220 requests axis feedback data from the feedback encoders 130 which latch the axis feedback data and provide the axis feedback data in reply (412). As the feedback encoders 130 complete their transfer to the feedback and I/O subsystem circuitry 220, the axis feedback data is transferred from the feedback and I/O subsystem circuitry 220 to the processing module 210 via the bus 230 (414). In this manner, the axis feedback data is available to the first processor core 302 at the next cycle (416). The safety margin deadline (418) is used in conjunction with the IRQ delay (404) for real time scheduling validation.

The main control loop of the second processor core 304, which provides trajectory points to the first processor core 302, is triggered by the motion control loop performed by the first processor core 302 once every millisecond (420). In other words, the first iteration in a series of iterations of the motion control loop triggers or initiates the main control loop on the second processor core 304. In the depicted example, the series of iterations includes four iterations of the motion control loop being performed by the first processor core 302 for each iteration of the main control loop being performed by the second processor core 304. Accordingly, the motion control loop performed by the first processor core 302 is completed during each periodic interval marked by the cycle signal of the timer circuit 310 and the main control loop performed by the second processor core 304 is completed during four periodic intervals marked by the cycle signal. The motion control loop performed by the first processor core 302 may implement a proportional integral and derivative (PID) position loop to refine the generated axis control data based on the trajectory point and the axis feedback data received. Other types of control loops may be used as well for generating the motion control data based on the trajectory point and the axis feedback data.

Figure 5:
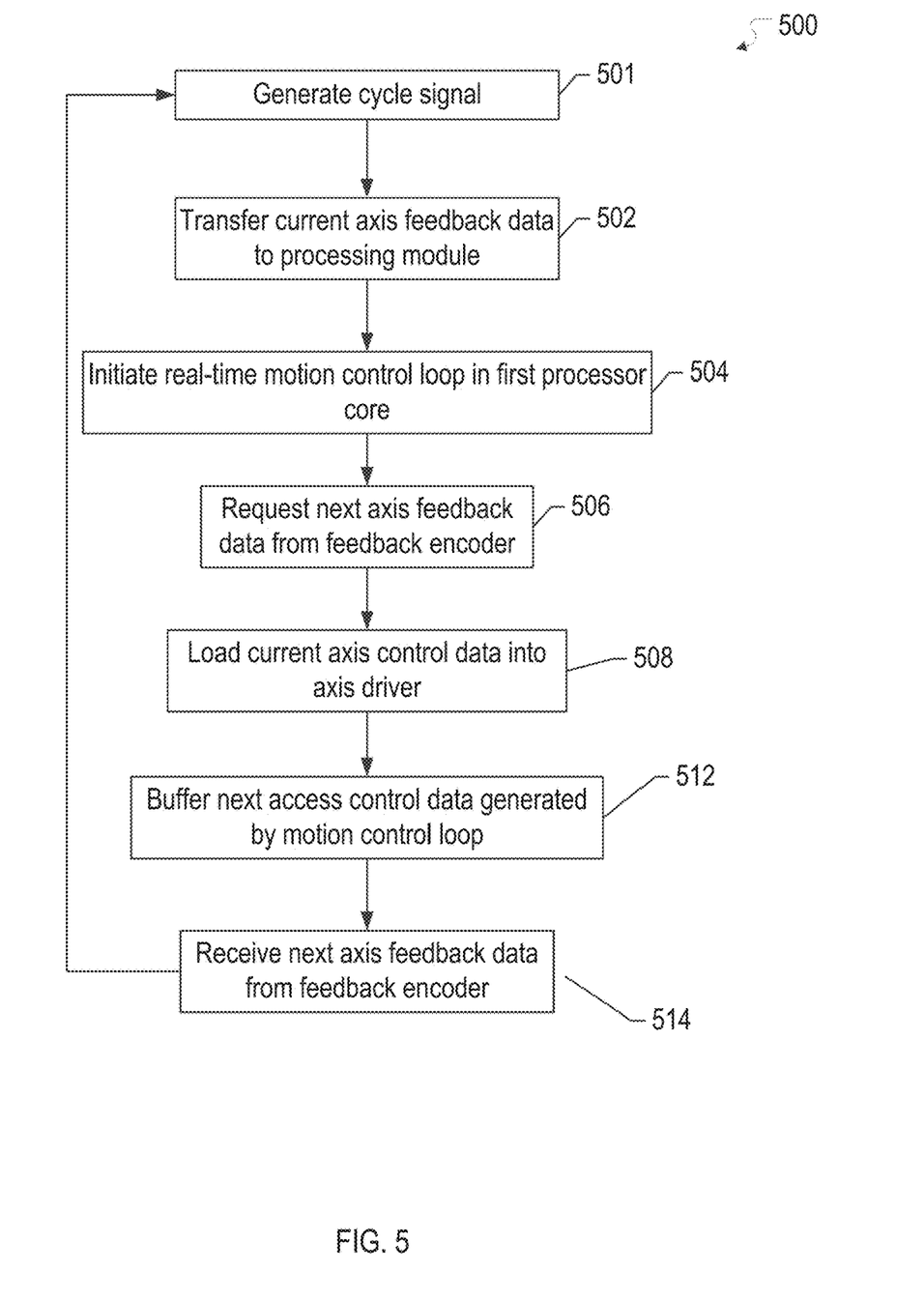
FIG. 5 illustrates a flow diagram of an example process of a machine tool control system in accordance with one or more implementations.

FIG. 5 illustrates a flow diagram of an example process 500 of machine tool control system 110 in accordance with one or more implementations. For explanatory purposes, the blocks of the example process 500 are described herein as occurring in serial, or linearly. However, multiple blocks of the example process 500 may occur in parallel. In addition, the blocks of the example process 500 need not be performed in the order shown and/or one or more of the blocks of the example process 500 need not be performed.

The process 500 is initiated when the timer circuit 310 outputs a cycle signal at a periodic interval (501). In response to the cycle signal, subsystem circuitry 220 transfers current axis feedback data received from one or more feedback encoders 130 to processing module 210 (502). The cycle signal generates an interrupt request at the first processor core 302, which initiates a real-time control loop in the first processor core 302 (504). The real-time motion control loop generates next access control data based on the current axis feedback data and a current trajectory point.

Further in response to the cycle signal, subsystem circuitry 220 requests next axis feedback data from the one or more feedback encoders 130 (506). According, to aspects of the subject technology, a fixed time delay may be observed before making the request for the axis feedback data. Further in response to the cycle signal, current axis control data is loaded into the one or more axis drivers 120 (508). As noted above, the current axis control data may be sitting in DACs 222 until the cycle signal is generated.

Once the motion control loop has generated the next axis control data, the next axis control data is buffered (512). As noted above, the next axis control data may be buffered in DACs 222 where the axis control data will wait until the next cycle signal before being pushed to the one or more axis drivers 120. In response to the request for axis feedback data, subsystem circuitry 220 receives the next axis feedback data from the one or more feedback encoders 130. The subsystem circuitry 220 provides the next axis feedback data to the processing module 210 at the next cycle signal. The periodic interval then repeats upon the next cycle signal.

I/O interface 224 may include a network interface(s), which may include an Ethernet interface, a WiFi interface, a Bluetooth interface, a cellular interface, a power line interface, a multimedia over coax alliance (MoCA) interface, a reduced gigabit media independent interface (RGMII), or generally any interface for connecting to a network. The network interface 616 may include, or may be coupled to, a physical layer module. In this manner, the machine tool control system 110 can be a part of one or more networks of computers (such as a local area network ("LAN"), a wide area network ("WAN"), or an Intranet, or a network of networks, such as the Internet.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C, any combination of A, B, and C, and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A machine tool control system, comprising:
a processing module including:
  memory circuitry;
  a multi-core processor including:
    a first set of processor cores assigned exclusively to perform real-time tasks for controlling motion relative to one or more axes by executing first instructions stored in the memory circuitry;
    a second set of processor cores assigned exclusively to perform non-real-time tasks by executing second instructions stored in the memory circuitry; and
    a timer circuit configured to generate a cycle signal at periodic intervals; and
  subsystem circuitry coupled to the processing module by a bus,
  wherein the subsystem circuitry is configured to obtain axis feedback data from one or more feedback encoders and axis control data from the first set of processor cores during each of the periodic intervals, wherein the subsystem circuitry is further configured to provide the obtained axis feedback data to the first set of processor cores and the axis control data to one or more axis drivers simultaneously at the cycle signals generated by the timer circuit, wherein the first set of processor cores comprises:
a first processor core assigned exclusively to perform a motion control loop for each of the one or more axes; and
a second processor core assigned exclusively to perform a main control loon for each of the one or more axes, wherein the main control loop performed by the second processor core generates a trajectory point for motion relative to a respective axis of the one or more axes based on a program, and wherein the motion control loop performed by the first processor core generates the axis control data for a respective axis driver corresponding to the respective axis based on the generated trajectory point and the axis feedback data.

2. The machine tool control system of claim 1, wherein the processing module comprises a module interface configured to detachably connect the processing module to the bus.

3. The machine tool control system of claim 1, wherein each iteration of the motion control loop is performed during a single interval of the periodic intervals and each iteration of the main control loop is performed during a plurality of intervals of the periodic intervals.

4. The machine tool control system of claim 1, wherein the cycle signal generated by the timer circuit is communicated internally to the multi-core processor only with the first processor core.

5. The machine tool control system of claim 1, wherein the second set of processor cores comprises:
a third processor core assigned exclusively to execute an operating system for the machine tool control system; and
a fourth processor core assigned exclusively to generate a graphical user interface for display and manage data communication with the machine tool control system.

6. The machine tool control system of claim 5, further comprising a input/output interface configured to electrically couple a user interface to the machine tool control system, wherein the user interface comprises a display for displaying the graphical user interface generated by the fourth processor core and a user input system for receiving user input.

7. The machine tool control system of claim 1, wherein the memory circuitry comprises:
volatile memory; and
non-volatile memory storing the first and second instructions.

8. The machine tool control system of claim 1, further comprising:
a digital-to-analog converter corresponding to each of the one or more axis drivers; and
an axis driver interface configured to electrically couple the one or more axis drivers to the machine tool control system,
wherein the subsystem circuitry is configured to buffer the axis control data in the digital-to-analog converter for each of the one or more axis drivers during each of the periodic intervals, and
wherein the digital-to-analog converter for each of the one or more axis drivers is configured to convert and output the buffered axis control data to the one or more axis drivers via the axis driver interface at each of the cycle signals generated by the timer circuit.

9. The machine tool control system of claim 1, further comprising an axis feedback interface configured to electrically couple the one or more feedback encoders to the machine tool control system,
wherein the subsystem circuitry is configured to:
request the axis feedback data from the one or more feedback encoders during each of the periodic intervals via the axis feedback interface; and
receive the requested axis feedback data from the one or more feedback encoders during each of the periodic intervals via the axis feedback interface.

10. A method for controlling a machine tool, the method comprising:
generating a cycle signal at periodic intervals by a timer circuit;
in response to each cycle signal:
transferring current axis feedback data from subsystem circuitry to a processing module comprising a multi-core processor at the cycle signal;
initiating a real-time motion control loop in a first processor core of the multi-core processor in a processing module, wherein the real-time motion control loop generates next axis control data based on the current axis feedback data and a current trajectory point;
initiating a real-time main control loop in a second processor core of the multi-core Processor, wherein the real-time main control loop generates a next trajectory point;
requesting, by the subsystem circuitry, next axis feedback data from a feedback encoder corresponding to an axis of the machine tool; and
loading current axis control data into an axis driver corresponding to the axis; and
during each of the periodic intervals:
buffering the next axis control data generated by the motion control loop, wherein the next axis control data is loaded into the axis driver at a next cycle signal; and
receiving the next axis feedback data from the feedback encoder, wherein the next axis feedback data is transferred to the processing module at the next cycle signal by the subsystem circuitry.

11. The method of claim 10, wherein the main control loop is initiated by the motion control loop once every predetermined number of periodic intervals, and wherein each iteration of the motion control loop is performed during a single periodic interval of the periodic intervals and each iteration of the main control loop is performed during the predetermined number of periodic intervals.

12. The method of claim 11, wherein the next trajectory point is used by the motion control loop to generate next axis control data during a first periodic interval following the predetermined number of periodic intervals.

13. The method of claim 12, wherein the predetermined number of periodic intervals is four.

14. The method of claim 10, wherein requesting next axis feedback is delayed a predetermined period of time following each cycle signal.

15. The method of claim 10, wherein buffering the next axis control data comprises loading the next axis control data into a digital-to-analog converter, and wherein loading the current axis control data comprises transferring converted axis control data from the digital-to-analog converter to the axis driver.

* * * * *